United States Patent
Uzee

(10) Patent No.: US 8,653,189 B2
(45) Date of Patent: Feb. 18, 2014

(54) OIL-EXTENDED, LOW STYRENE CONTENT STYRENE-BUTADIENE-STYRENE TRIBLOCK COPOLYMER COMPOSITIONS AND ARTICLES FABRICATED THEREFROM

(75) Inventor: Andre J. Uzee, Baton Rouge, LA (US)

(73) Assignee: TSRC (USA) Investment Corporation, Wilmington, DE (US)

( * ) Notice: Subject to any disclaimer, the term of this patent is extended or adjusted under 35 U.S.C. 154(b) by 0 days.

(21) Appl. No.: 12/529,837

(22) PCT Filed: Feb. 18, 2008

(86) PCT No.: PCT/US2008/054195
§ 371 (c)(1),
(2), (4) Date: Sep. 3, 2009

(87) PCT Pub. No.: WO2008/109245
PCT Pub. Date: Sep. 12, 2008

(65) Prior Publication Data
US 2010/0092753 A1    Apr. 15, 2010

Related U.S. Application Data

(60) Provisional application No. 60/905,738, filed on Mar. 8, 2007.

(51) Int. Cl.
*C08L 25/06* (2006.01)
*C08L 9/06* (2006.01)

(52) U.S. Cl.
USPC .......... 525/90; 525/50; 525/55; 525/88; 525/89; 525/240; 524/505; 524/68; 524/71; 428/220; 428/339

(58) Field of Classification Search
USPC ............ 524/502, 505, 68, 71; 428/339, 220; 525/50, 55, 88, 89, 90, 240
See application file for complete search history.

(56) References Cited

U.S. PATENT DOCUMENTS

| | | | | |
|---|---|---|---|---|
| 5,252,664 A | * | 10/1993 | Thompson et al. | 525/64 |
| 6,734,247 B2 | * | 5/2004 | Donn et al. | 524/500 |
| 2006/0052535 A1 | * | 3/2006 | Ajbani et al. | 525/88 |

FOREIGN PATENT DOCUMENTS

| | | | |
|---|---|---|---|
| WO | WO 2004104095 | * | 12/2004 |
| WO | WO 2008/063807 | * | 5/2008 |

* cited by examiner

*Primary Examiner* — James J Seidleck
*Assistant Examiner* — Deve E Valdez
(74) *Attorney, Agent, or Firm* — Snell & Wilmer L.L.P.

(57) ABSTRACT

The present invention relates to oil-extended styrenic block copolymer compositions that include a thermoplastic polymer, such as polystyrene, and a styrenic block copolymer, especially a linear styrene-butadiene-styrene triblock copolymer, with a styrene content less than 23 percent by weight, based upon total composition weight. The compositions yield very thin polymeric films with satisfactory physical properties.

11 Claims, No Drawings

OIL-EXTENDED, LOW STYRENE CONTENT STYRENE-BUTADIENE-STYRENE TRIBLOCK COPOLYMER COMPOSITIONS AND ARTICLES FABRICATED THEREFROM

The present invention relates generally to oil-extended polymer blend compositions that contain both a styrenic triblock copolymer (SBC) that has a low styrene content and a thermoplastic polymer as well as to articles of manufacture fabricated therefrom, especially mono-layer films or multi-layer films that include at least one layer comprising such oil extended polymer blend compositions. The present invention relates particularly to such polymer blend compositions wherein the low styrene content block copolymer is a styrene-butadiene-styrene triblock copolymer.

"Low", as used herein, means a styrenic triblock copolymer with a polymerized styrene content within a range of from 15 percent by weight (wt %) to 23 wt %, based upon total triblock copolymer weight.

United States Patent Application Publication (USPAP) 2004/0049836 A1 (Ashraf et al.) discloses radiation-curable materials that comprise from 20 wt % to 80 wt % of a thermoplastic elastomer or TPE that is a block copolymer having at least one hard block comprising vinylarenes and at least one soft block comprising dienes; from 5 wt % to 60 wt % of a processing oil; and from 10 wt % to 60 wt % of a macro photoinitiator. Example 4 includes 72 wt % of a styrene-butadiene-styrene (SBS) block copolymer, 15 wt % polystyrene, 8 wt % mineral oil and 5 wt % of a macro photoinitiator. The SBS block copolymer, VECTOR™ 8508 (Dexco Polymers LP) has a nominal styrene content of 30 wt %, based upon total block copolymer weight.

USPAP 2006/0155044 (Joly et al.) discloses a composition of matter suitable for use in manufacturing a polymeric film. The composition comprises (a) at least 65 wt % of a SBC, (b) from 5 wt % to 25 wt % of a second thermoplastic resin and (c) from 1 wt % to 10 wt % of a plasticizing oil, each wt % being based upon composition weight and, when taken together, total 100 wt %. The SBC must contain a substantially random I/B polymer mid-block that has an I/B ratio within a range of from 30/70 to 70/30. The SBC has S content within a range of from 28 wt % to 31 wt %, based upon SBC weight, and an apparent molecular weight within a range of from 110,000 to 160,000.

USPAP 2006/0205874 (Uzee et al.) teaches blends of elastomeric and thermoplastic monovinylidene aromatic-conjugated diene block copolymers that form transparent elastomeric products. The blends comprise from 65 to 92 parts by weight (pbw) of at least one elastomeric block copolymer that has a monovinylidene aromatic content of less than 50 wt %, based on total weight of the elastomeric block copolymer, and a weight average molecular weight ($M_w$) of 50,000 to 400,000, from 8 to 35 pbw of at least one thermoplastic block copolymer that has a monovinylidene aromatic content of 50 wt % or more, based on total weight of the thermoplastic block copolymer, and a $M_w$ of 50,000 to 300,000, and from 0 to 30 pbw of an extender oil, with all pbw being based upon total weight of elastomeric block copolymer, thermoplastic block copolymer and extender oil. The block copolymers may be linear or branched and contain from 2 to 7 blocks, with triblock copolymers such as styrene-butadiene-styrene (SBS) and styrene-isoprene-styrene (SIS) triblock copolymers being preferred. In accord with paragraph [0020], the monovinylidene aromatic block components may constitute from 8 wt % to less than 50 wt % of the elastomeric block copolymer. A most preferred range for monovinylidene aromatic block copolymers is from 15 wt % to 35 wt %, based upon block copolymer weight. Paragraph [0022] specifies that each monovinylidene aromatic monomer block has a peak molecular weight of at least 9,000, preferably at least 9,500 and more preferably at least 10,000.

USPAP 2002/0107323 (Uzee et al.) describes transparent polymeric blends that comprise three components: a monovinyl aromatic-conjugated diene copolymer (e.g. an SBS triblock copolymer) having a $M_w$ of 50,000 to 400,000, a monovinylidene aromatic polymer (e.g. general purpose polystyrene) having a $M_w$ of 50,000 to 400,000, and a SIS triblock copolymer with a $M_w$ of 40,000 to 150,000 and a styrene content of from 25 wt % to 60 wt %, based upon triblock copolymer weight.

USPAP 2004/0250952 (Lechat et al.) discloses elastomer-based, pressure-sensitive adhesive compositions that comprise a tackified styrenic block copolymer (SBC) provided the SBC is a tetrablock and/or a pentablock copolymer that has a styrene content of from 10 wt % to 27 wt %, with 15 wt % to 20 wt % or even 18 wt %, based upon SBC weight, being more preferred.

USPAP 2002/0132922 (Delme et al.) relates to linear tetrablock copolymer compositions and their use in road marking applications. Preferred tetrablock copolymers include styrene-isoprene-styrene-butadiene (SISB), styrene-isoprene-styrene-isoprene (SISI), styrene-butadiene-styrene-butadiene (SBSB) and styrene-butadiene-styrene-isoprene (ABSI) tetrablock copolymers. Preferred S block contents range from 5 wt % to 70 wt % with 10 wt % to 30 wt % being most preferred.

U.S. Pat. No. 4,732,928 (Mizushiro et al.) provides thermoplastic elastomer compositions that comprise blends of two different SBCs, a polyphenylene ether resin and a non-aromatic rubber softening oil. One of the SBC's has a styrene content within a range of from 15 wt % to 60 wt %, based upon SBC weight.

As used throughout this specification, definitions presented in this paragraph, in succeeding paragraphs or elsewhere in the specification, have meanings ascribed to them where first defined.

When ranges are stated herein, as in a range of from 2 to 10, both end points of the range (e.g. 2 and 10) are included within the range unless otherwise specifically excluded.

A first aspect of the present invention is an oil-extended polymer blend composition comprising:

a. an elastomeric linear styrene-butadiene-styrene triblock copolymer, the triblock copolymer having a styrene content within a range of from 15 percent by weight to 23 percent by weight, based upon triblock copolymer weight, and a molecular weight within a range of from 90,000 to 130,000;

b. a thermoplastic polymer; and c. an extender oil, the extender oil being present in an amount within a range of from 4 percent by weight to 20 percent by weight, based upon total composition weight.

A second aspect of the present invention is an elastomeric film comprising the composition of the first aspect, the film having a transverse direction ratio of load at 200 percent elongation to unload at 50 percent elongation less than 3.8, preferably less than 3.0. The film is preferably a polymeric mono-layer film or at least one layer of a multi-layer film.

References to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups.

Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Expressions of temperature may be in terms either of degrees Fahrenheit (° F.) together with its equivalent in degrees centigrade (° C.) or, more typically, simply in degrees centigrade (° C.).

Expressions of molecular weight refer to "corrected weight average molecular weights" ($M_w$). Determine Mw by size exclusion chromatography (SEC) using commercially available polystyrene calibration standards, HPLC (High Performance Liquid Chromatography) grade tetrahydrofuran (THF) flowing at a rate of 1 milliliter per minute (ml/min) as a carrier solvent, an Agilent Model 1100 series liquid chromatograph with a G1362A refractive index detector, a G1314A variable wavelength detector, four 300 millimeter (mm) by 7.5 mm Polymer Laboratories PLGel™ SEC columns packed with five micrometer (μm) particles, one Mixed-C, two $10^5$ angstrom (Å) ($1\times10^{-5}$ meter (m)), and one $10^4$ Å ($1\times10^{-6}$ m), and molecular weight corrections as taught by Runyon et al., *Journal of Applied Polymer Science*, Volume 13, pages 2359-2369 (1969) and Tung, L. H., *Journal of Applied Polymer Science*, Volume 24, pages 953-963 (1979). Column and detectors operate at a set point temperature of 40° C. with a run time of 45 minutes. Mw values, often stated as dimensionless numbers, may alternatively be specified in terms of Daltons, with Daltons being equivalent to grams per mole (g/M).

The determination of weight percent styrene in a SBS triblock copolymer is based upon a ratio of signals from a refractive index detector to signals from a variable wavelength detector set at 254 nanometers (nm), gathered during SEC analysis in accord with teachings of Runyon et. al. noted above as well as those of Yau et al., *Modern Size-Exclusion Chromatography*, ISBN-0-471-03387-1, John Wiley and Sons, New York, pages 404-412 (1979).

Sequential anionic polymerization in an inert organic solvent, as taught in U.S. Pat. No. 5,242,984 and U.S. Pat. No. 5,134,968, the relevant teachings of which are incorporated herein by reference, provides a preferred route to preparation of SBS triblock copolymers. In simple terms, sequential anionic polymerization involves adding a first styrenic monomer, preferably styrene, to an anionic polymerization initiator, preferably an alkyllithium compound such as n-butyllithium, dispersed in an inert organic solvent and allowing polymerization of the first monomer to proceed substantially to completion before adding butadiene and allowing polymerization to once again proceed substantially to completion, followed in turn by a second addition of a styrenic monomer, which may be the same as, or different than, the first styrenic monomer. After allowing styrene monomer added via the second addition to proceed to a desired level of polymerization, preferably to substantially complete polymerization, terminate further polymerization by adding a proton donating agent, such as an alkanol, e.g. ethanol or water. Neutralize the SBS triblock polymer solution by adding phosphoric acid. Optionally, but preferably, add both a phenolic antioxidant and a phosphite antioxidant to the SBS triblock polymer solution.

Oil-extended polymer blend composition of the first aspect of the present invention comprises three components. A first component is an elastomeric linear SBS triblock copolymer. A second component is a thermoplastic polymer. A third component is an extender oil.

The SBS triblock copolymer preferably has a styrene content within a range of from 15 wt % to 23 wt %, more preferably from 18 wt % to 23 wt % and still more preferably from 20 wt % to 22.5 wt %, in each case based upon total triblock copolymer weight. The SBS triblock copolymer also has a weight average molecular weight ($M_w$) within a range of from 90,000 to 130,000, provided that each end block of such SBS triblock copolymers has a minimum $M_w$ of 9,500. A practical maximum end block Mw, based upon a styrene content of 23 wt % and a triblock copolymer Mw of 130,000 is 14,950 or, more generally, less than 15,000.

The thermoplastic polymer is preferably at least one resin selected from polystyrene (especially polystyrene with a Mw in excess of 100,000 g/M such as PS 3900, commercially available from Nova Chemicals), high impact polystyrene (also known as "HIPS" or rubber-modified polystyrene), a styrene-isoprene copolymer, a styrene-butadiene copolymer, a styrenic block copolymer other than the styrenic triblock copolymer, preferably a styrenic block copolymer with a styrene content in excess of 65 wt %, based upon block copolymer weight, and an olefin polymer resin, and most preferably polystyrene. Olefin polymer resins preferably include ethylene-based polymers and propylene-based polymers. Suitable ethylene-based polymers include high-pressure low density polyethylene, high density polyethylene, linear low density polyethylene, ultra-low density polyethylene, ethylene/alpha-olefin copolymers wherein the alpha-olefin contains from three to twenty carbon atoms and ethylene/alpha-olefin interpolymers (sometimes referred to as "olefin block copolymers" or "OBC"). Desirable propylene-based polymers include homopolymer polypropylene, propylene/alpha-olefin copolymers wherein the alpha-olefin contains two (2) or from four (4) to eight (8) carbon atoms.

WO 2005/090427 (Arriola et al.), the relevant teachings of which are incorporated herein, provides that desirable olefin block copolymers include ethylene/alpha-olefin copolymers that (a) have a molecular weight distribution (MWD or ratio of weight average molecular weight ($M_w$) to number average molecular weight ($M_n$) or $M_w/M_n$) of from about 1.7 to about 3.5, at least one melting point (Tm), in degrees Celsius or centigrade (° C.), and a density (d), in grams/cubic centimeter (g/cc), wherein numerical values of Tm and d correspond to a relationship such that Tm is greater than (>)−2002.9+4538.5 (d)−2422.2(d)2; or (b) have a MWD of from about 1.7 to about 3.5, and is characterized by a heat of fusion (ΔH), in joules per gram (J/g), and a delta quantity, (ΔT), in degrees Celsius, with ΔT being defined as a difference in temperature between a temperature corresponding to that differential scanning calorimetry (DSC) peak having greatest height and a temperature corresponding to that crystallization analysis fractionation (CRYSTAF) peak having greatest height, with numerical values for ΔT and ΔH having a relationship as follows:

ΔT>−0.1299(ΔH)+62.81 for ΔH greater than zero and up to and including 130 J/g,

ΔT≥48° C. for ΔH greater than 130 J/g, the CRYSTAF peak being determined when at least five (5) percent by weight of the interpolymer has an identifiable CRYSTAF peak or, if less than 5 percent of the polymer has an identifiable CRYSTAF peak, the CRYSTAF peak temperature is nominally 30° C.; or (c) is characterized by an elastic recovery (Re), in percent at 300 percent strain and 1 cycle measured with a compression-molded film of the ethylene/α-olefin interpolymer, and has a density (d), in g/cc, wherein numerical values of Re and d satisfy a relationship of Re being >1481-1629(d) when the interpolymer is substantially free of a cross-linked phase; or (d) has a molecular fraction that elutes between 40° C. and 130° C. when fractionated using temperature rising elution fractionation (TREF), characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole interpolymer) within 10 percent of that of the OBC; or (e) has a storage modulus at 25° C., (G'(25° C.)), and a storage modulus at 100° C., (G'(100° C.)), wherein a ratio of G'(25° C.) to G'(100° C.) lies within a range of from about 1:1 to about 9:1.

The ethylene/α-olefin interpolymer or OBC may also:

(a) have a molecular fraction that elutes between 40° C. and 130° C. when fractionated using TREF, characterized in that the fraction has a block index of at least 0.5 and up to about 1 and a MWD greater than about 1.3; or (b) have an average block index greater than zero and up to about 1.0 and a MWD greater than about 1.3.

CRYSTAF determinations use a CRYSTAF 200 unit commercially available from PolymerChar, Valencia, Spain with test samples that are dissolved in 1,2,4-trichlorobenzene at 160° C. (0.66 mg/mL) for 1 hour (hr) and stabilized at 95° C. for 45 minutes. Sampling temperatures range from 95 to 30° C. with a cooling rate of 0.2° C./min. An infrared detector is used to measure the polymer solution concentrations. The cumulative soluble concentration is measured as the polymer crystallizes while temperature decreases. An analytical derivative of a cumulative profile reflects existence of short chain branching distribution of the polymer. The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Compositions of the present invention preferably contain oil as an extender material. The oil is present in an amount that is preferably within a range of from 4 wt % to 20 wt %, more preferably within a range of from 5 wt % to 20 wt % and still more preferably within a range of from 5 wt % to 15 wt %, in each case based upon total composition weight.

Suitable extender materials include hydrocarbon oils, naphthenic oils, and polymers or oligomers derived from a monomer that has olefinic unsaturation and is compatible with at least one of isoprene and butadiene. Illustrative extender materials include SHELLFLEX™, CATENEX™ and ONDINA™ oils supplied by Royal Dutch/Shell, KAYDOL™ oils supplied by Witco, TUFFLO™ oils supplied by Arco and PRIIVIOL™ oils supplied by Exxon/Mobil and HYDROBRITE™ supplied by Crompton. Other suitable extender materials include compatible liquid tackifying resins such as REGALREZ™ R-1018 supplied by Eastman or ESCOREZ™ tackifying resins supplied by ExxonMobil. ESCOREZ™ and REGALREZ™ hydrocarbon resins are low molecular weight partially and fully hydrogenated water-white inert thermoplastic resins derived from petrochemical feedstocks. Still other suitable extender materials include liquid polymers with a $M_w$ less than about 30,000 such as liquid polybutene, liquid isoprene copolymers and liquid styrene/isoprene copolymers as well as vegetable oils, vegetable oil derivatives, paraffin and microcrystalline waxes. The extender material is preferably white mineral oil.

While not necessary, polymer blend compositions of the present invention may also include one or more conventional rubber compound additives, processing aids such as antioxidants and anti-ozonants, ultraviolet light stabilizers and heat stabilizers.

Illustrative antioxidants include both primary antioxidants, e.g. a hindered phenol, and secondary antioxidants, e.g. phosphite derivatives, or blends primary antioxidants, blends of secondary antioxidants or blends of both primary antioxidants and secondary antioxidants. Examples of commercially available antioxidants include 2,4-bis-(n-octylthio)-6-(4-hydroxy-3,5-di-tertiary-butylanilino)-1,3,5-triazine (IRGANOX™ 565, Ciba-Geigy), tetrakis-ethylene-(3,5-di-tertiary-butyl-4-hydroxy-hydrocinnamate)methane (IRGANOX™ 1010, Ciba-Geigy) and tris(2,4-di-tert-butylphenyl)phosphite (IRGAPHOS™ 168, Ciba-Geigy). Other suitable antioxidants include those developed to minimize butadiene segment degradation, e.g. 2[1-(2-hydroxy-3,5-di-terpentylphenyl)ethyl)]-4,6-di-tert-pentylphenylacrylate (SUMILIZER™ GS, Sumitomo) and pentaerythrythyltetrakis(3-dodecylthiopropionate) (SUMILIZER™ T-PD, Sumitomo).

Polymer blend composition of the present invention may further include slip agents, such as those disclosed in U.S. Pat. No. 4,476,180 (Wnuk), the relevant teachings of which are incorporated herein by reference, especially those in column 4, lines 39-47. Conventional slip agents, often used in polymeric film fabrication, include those derived from an amide of a 12 to 22 carbon atom ($C_{12}$-$C_{22}$) fatty acid. Typical slip agent amounts range from 0.05 wt % to 5 wt %, preferably no more than 3 wt %, in each case based upon total polymer blend composition weight.

Preparation of Film-Forming Polymer Blend Compositions of the Present Invention need not employ any particular apparatus or process. Conventional mixing apparatus, such as Banbury mixers, two roll mills and extruders, especially single screw and twin screw extruders, yield satisfactory results. Two or more blend composition components may, if desired, be pre-mixed or pre-compounded before addition to a mixing apparatus. An extender material, when used, may be added during triblock copolymer production or post-blended after such production or both. If added during triblock copolymer production, a favorable addition timing follows termination of polymerization and precedes triblock copolymer recovery and further processing, e.g. pelletization and production in pellet, porous pellet, crumb or powder form.

Compositions of the present invention find utility in, among other end-use applications, manufacture of both cast films and blown films, either as stand alone films or as a layer of a multi-layer film structure. Skilled artisans readily understand preparation of such films and apparatus, e.g. extruders and dies, used to fabricate such films. Films, especially monolayer or stand alone films, have a balance of physical properties that favors use in personal hygiene applications.

The elastomeric film of the second aspect has a transverse direction ratio of load at 200 percent elongation to unload at 50 percent elongation that is preferably less than 3.8, more preferably less than 3.5 and still more preferably less than 3.0. The elastomeric film has a thickness, irrespective of whether it is a monolayer film or a layer in a multilayer film, that is preferably less than 100 micrometers, more preferably less than 80 micrometers and even more preferably less than 50 micrometers. When the elastomeric film is a monolayer film, it has a minimum thickness of at least 35 micrometers. In a multilayer film, a layer of the elastomeric film has a minimum thickness of at least 25 micrometers.

Compositions of the present invention may, if desired, include an amount of a styrene-isoprene-styrene (SIS) block copolymer, especially a linear SIS triblock copolymer, which has a similar low styrene content (e.g. 23 wt %, based upon SIS block copolymer weight, preferably from 15 wt % to 23 wt %) without departing from the spirit or scope of the present invention. The addition of such a SIS triblock copolymer does not impair preparation of thin (less than 100 micrometer (μm)) films from compositions of the present invention.

The following examples illustrate, but do not limit, the present invention. All parts and percentages are based upon weight, unless otherwise stated. All temperatures are in ° C. Comparative Examples (Comp Ex) are designated by capital alphabetic letters and Examples (Ex) of the present invention are designated by Arabic numerals. Unless otherwise stated herein, "room temperature" and "ambient temperature" are nominally 25° C.

Triblock Copolymers and their Preparation

"SBS-1" is a commercially available linear SBS triblock copolymer with a styrene content of 31 wt %, based upon copolymer weight (VECTOR™ 2518, Dexco Polymers LP, a Dow/ExxonMobil Venture).

Preparation of "SBS-2"

Add 331 kilograms (kg) of cyclohexane as an inert hydrocarbon solvent to a stirred 1100 liter (L) reactor under a gaseous nitrogen ($N_2$) atmosphere and heat contents of the reactor to a set point temperature of 65° C. before adding, in order, 677 grams (g) of a 1.1 molar (M) solution of sec-butyllithium and 13.1 kg of styrene monomer. Allow styrene monomer to polymerize in stage one for a period of 15 minutes, during which reactor contents temperature rises to 69° C. and then falls to 62° C., before adding 90.2 kg of butadiene monomer and allowing it to polymerize which causes reactor contents reach a peak temperature of 81° C. before dropping back again to 68° C. to show substantial completion of butadiene polymerization. Add 13.1 kg of styrene monomer and allow it to polymerize over a period of 15 minutes before quenching further polymerization by adding 81.3 g of isopropanol to the reactor contents to yield raw SBS triblock copolymer.

Neutralize reactor contents by adding phosphoric acid at a molar ratio of 0.4 mole of acid per mole of sec-butyllithium. Add, to the neutralized reactor contents, a phenolic antioxidant (IRGANOX™ 565) in an amount of 1000 parts per million parts by weight (ppm) of raw SBS triblock copolymer and a secondary phosphite antioxidant (tris-nonylphenylphosphite or TNPP) in an amount of 5000 ppm of SBS triblock copolymer, then steam strip reactor contents at a set point temperature of 100° C. for at least two hours to yield a first batch stabilized and devolatilized SBS triblock copolymer.

SEC analysis of the stabilized and devolatilized SBS triblock copolymer reveals a single main peak with a number average molecular weight ($M_n$) of 157,200 on a polystyrene calibration basis and a peak average molecular weight of 152,400 on a polystyrene calibration basis. The SBS triblock copolymer has a nominal styrene content of 22.9 wt %, based upon total triblock weight. The SBS triblock copolymer has a corrected peak average molecular weight is 98,123.

Replicate the procedure used to make the first batch to prepare two additional batches of stabilized and devolatilized SBS triblock copolymer. One additional batch has a nominal styrene content of 21.6 wt. %, based upon total triblock weight, and a corrected peak average molecular weight of 95,516. The other additional batch has a nominal styrene content of 22.7 wt. %, based upon total triblock weight, and a corrected peak average molecular weight of 100,604. Blend the three batches together to yield a SBS triblock copolymer designated as "SBS-2" with an average nominal styrene content of 22.4 wt %, based upon total weight of SBS triblock copolymer and an average corrected peak average molecular weight of 98,100. As shown in Table 1 below, SBS-2 has an average styrene end block molecular weight of 10,990 and an average butadiene content of 77.6 wt %, based upon total weight of SBS triblock copolymer.

Preparation of SBS-3 Through SBS-5

Replicate preparation of SBS-2 three times, with changes, to produce SBS 3 through SBS-5. For SBS-3, change the amounts of cyclohexane, sec-butyllithium, styrene monomer and butadiene monomer respectively to 331 kg, 677 g, 10.5 kg (for each addition), and 66.9 kg. For SBS-4, change the amounts of cyclohexane, sec-butyllithium, styrene monomer and butadiene monomer respectively to 340 kg, 681 g, 11.6 kg (for each addition), and 93.4 kg. For SBS-5, change the amounts of cyclohexane, sec-butyllithium, styrene monomer and butadiene monomer respectively to 361 kg, 509 g, 8.8 kg (for each addition), and 70.3 kg. See Table 1 below for average corrected weight average molecular weight, average styrene end block molecular weight, average styrene content and average butadiene content.

TABLE 1

| Triblock Copolymer Identification | Average Corrected Weight Average Molecular Weight (Mw), (g/M) | Average Styrene End-block, Mw | Average Styrene Content, Wt. % | Average Butadiene Content, Wt. % |
|---|---|---|---|---|
| SBS-1 | 108,000 | 16,740 | 31.0 | 69.0 |
| SBS-2 | 98,100 | 10,990 | 22.4 | 77.6 |
| SBS-3 | 128,000 | 14,460 | 22.6 | 76.5 |
| SBS-4 | 102,600 | 10,260 | 20.0 | 79.3 |
| SBS-5 | 100,300 | 10,430 | 20.8 | 79.5 |

Preparation of Film Compositions

Place 13.2 kg of triblock copolymer, polystyrene homopolymer (PS) (PS 3900, Nova Chemicals) and paraffinic white mineral oil (MO-200, Witco Chemical) (save for Comp Ex B), apportioned according to weight percentages shown in Tables 3 and 4 below and 5.45 g of a fatty amide (KENAMIDE™ KE Ultra, Crompton Plastics Additives) into a 10 gallon (0.038 cubic meter ($m^3$)) bag and mix bag contents to prepare a dry blend. Feed the dry blend to a laboratory scale extruder (Scientific brand, Labtech Engineering Co., Ltd.) equipped with a two-hole strand die, a water bath (Scientific brand, Model LW-100, Labtech Engineering Co., Ltd.) and a strand pelletizer (Scientific brand, Model LS120, Labtech Engineering Co., Ltd.). The extruder has an internal diameter of 25 mm, and a length to diameter ratio (L/D) of 30, and is equipped with a MADDOCK™ mixer and a strand die). Operate the extruder according to parameters set forth in Table 2 below in conjunction with the strand die, water bath and strand pelletizer to convert the dry blend to a plurality of melt compounded pellets.

Convert compounded pellets into a polymeric film using the same laboratory scale extruder (Extr.) as used to make the compounded pellets and extruder operating conditions as set forth in Table 2 below for Comp Ex A-C and Ex 1-6, but replace the strand die, water bath and strand pelletizer with a laboratory scale cast film and sheet attachment (Scientific brand, Type LCR 300, where "LCR" means "liquid chilled rollers"). The attachment includes a slot die having a width of 25.4 centimeters (cm) and a die opening height of 914 micrometers (μm). Cast film from the slot die onto the liquid chilled rollers (to 35° C.) Increase roll speed to draw the cast film down in thickness to as thin a film as can be made in a stable, uniformly thick extrusion. Record that thickness in Table 3 or Table 4 as appropriate.

sample specimens from the plaque using an ASTM-D 1822 Type L die with 1.28 cm tabs for tensile and hysteresis testing. Cut the specimens, which have an initial gauge length of 25.4 mm, from the molded plaques such that longitudinal orientation of the specimens parallels plaque TD. Determine tensile stress-strain properties of the sample specimens according to ASTM Method D412-87.

"Tensile strength", also referred to as "tensile stress", in megapascals (MPa), represents a ratio of F to A, where F equals an observed force at a specified elongation of a test specimen and A equals cross-sectional area of a test specimen prior to elongation.

"Elongation percentage" or "% E" equals $100(L-L_O)/L_O$ where L equals observed distance in centimeters (cm) between bench marks on a stretched or elongated test specimen and $L_O$ equals distance in cm between the bench marks of a test specimen prior to stretching or elongation.

"Unload Force", also known as "force at unload", in MPa, equals a quotient of F' divided by A, where F' is an observed force at a specified elongation during return of a stretched or elongated test specimen to a relaxed (0% elongation) state during a first cycle of hysteresis testing and A is as defined above.

TABLE 2

| Ex/Comp Ex No. | A | B | C | 1 | 2 | 3 | 4 | 5 | 6 |
|---|---|---|---|---|---|---|---|---|---|
| Extr. Temp Zone 1, ° C. | 150 | 150 | 150 | 150 | 150 | 150 | 150 | 150 | 150 |
| Extr. Temp Zone 2, ° C. | 165 | 165 | 165 | 165 | 165 | 165 | 165 | 165 | 165 |
| Extr. Temp Zone 3, ° C. | 175 | 175 | 175 | 175 | 175 | 175 | 175 | 175 | 175 |
| Extr. Temp Zone 4, ° C. | 175 | 175 | 175 | 175 | 175 | 175 | 175 | 175 | 175 |
| Extr. Temp Zone 5, ° C. | 175 | 175 | 175 | 175 | 175 | 180 | 180 | 180 | 180 |
| Melt Temp, ° C. (Record) | 178 | 180 | 181 | 181 | 179 | 180 | 181 | 179 | 179 |
| Extr. Screw Speed, rpm | 80 | 80 | 20 | 67 | 80 | 80 | 80 | 80 | 80 |
| Extr. Screw Power, % | 67 | 75 | 75 | 75 | 58 | 65 | 59 | 65 | 63 |
| Cast Film Die Temp. | 175 | 180 | 180 | 180 | 180 | 190 | 190 | 190 | 190 |
| Film Thickness, mils/μm | 7.5/190 | 36.0/914 | 36.0/914 | 3.0/76 | 2.8/71 | 1.5/38 | 2.0/51 | 1.5/38 | 1.5/38 |

Test Methods

A. Tensile Strength and Elongation at Failure

For each composition noted in Tables 3 (Comp Ex A-C) and 4 (Ex 1-6) below, convert a 100 gram (g) aliquot of compounded pellets into a fused sheet or blanket that has a thickness of approximately 5 mm, a machine direction (MD) normal to axes of the rolls and a transverse direction (TD) parallel to axes of the rolls using a preheated laboratory scale two roll mill (Scientific brand, Model Number LRM-S-110-3E, Labtech Engineering Co., Ltd.) that operates at a roll temperature of 155° C. Conversion of pellets to fused sheet takes approximately 90 seconds. Remove the fused sheet from the two-roll mill, noting both MD and TD, and maintain identification of the MD and TD through compression molding and testing (e.g. blanket MD is the same as test plaque MD).

Use a PHI hydraulic press operating at a set point temperature of 200° C. and convert 7.5 g of a fused sheet or blanket into test plaques (approximately 65 mm wide×115 mm long×0.94 mm thick) using a molding protocol. The molding protocol is as follows: pre-heat 3.0 minutes at zero pressure; apply pressure (10,000 kilogram (kg) ram force) for a period of 0.5 minute; increase pressure to 20,000 kg ram force and maintain that pressure for a period of 3.0 minutes; maintain the 20,000 kg ram force applied pressure for an additional period of 4.5 minutes to cool the molded plaque to a temperature suitable for plaque handling using ambient temperature (nominally 23° C.) water cooling; remove the cooled, molded plaque from the molding press and store the plaque for a period of at least 24 hours at 23° C., before die-cutting test B. Film Thickness ("FT").

Determine FT using a Starrettt Model 1015A thickness gauge. The gauge provides measurements in inches with 0.0005 inch increments. Convert the measurements to micrometers (μm) and record the results in Table 2 or Table 3 as appropriate.

C. Melt Flow Rate

Determine composition or polymer melt flow rate (MFR) in accord with ASTM D-1238, at 200° C. with a 5 kg weight using a standard die with a 2.0955 mm diameter hole (formerly known as Condition "G").

D. Hysteresis or Stress Relaxation Test

Measure hysteresis properties at room temperature (nominally 23° C.) using test sample specimens prepared as in Test Method A above and a test protocol as follows:
  (1) calibrate an INSTRON™ Model 1122 tensometer according to the manufacturer's instructions;
  (2) set instrument gauge length at 1" (2.54 cm) and place the test sample specimen in the instrument according to the manufacturer's instructions
  (3) set instrument cross head speed at a constant speed of 10 inches per minute (0.254 meter per minute);
  (4) pre-strain the test sample specimen to 500% elongation, then return (without hold time or elapsed time at 500% elongation) the sample to 0% elongation and record measured peak force at 500% elongation;
  (5) rest the sample for 120 seconds;
  (6) re-clamp the pre-strained test sample specimen to remove any slack in the specimen and maintain a 1" (2.54 cm) gauge length;

(7) start hysteresis testing and collect the data as follows:
  a) stretch the test sample specimen to 200% elongation at a rate of 10 inches per minute (0.254 per minute) and record both the stress and peak force at 200% elongation;
  b) hold the stretched test specimen at 200% elongation position for 30 seconds, record stress after the 30 second hold and calculate a value for relaxation at 200% elongation as percent of stress loss between 7a) and 7b); and
  c) return the stretched test specimen to 0% elongation at a rate of 10 inches per minute (0.254 meters per minute), determining and recording unload stress at 50% elongation during the return to 0% elongation.

Each reported or recorded result of Tests A through D represents an average of results from three test sample specimens. Record those results in Table 3 or Table 4 below, whichever is appropriate, in conjunction with composition data.

TABLE 3

| Comp. Ex | No. | A | B | C |
|---|---|---|---|---|
| SBS-1 (Commercial Product) | Wt % | 70 | | |
| SBS-2 | Wt % | | 85 | 82 |
| PS | Wt % | 15 | 15 | 15 |
| MO-200 | Wt % | 15 | | 3 |
| Total, Wt. % | | 100 | 100 | 100 |
| Styrene Content of block copolymer | Wt %. | 31.0 | 22.4 | 22.4 |
| Melt Flow Rate, | dg/min. | 2.0 | 1.5 | 2.5 |
| Tensile Testing (MD) | | | | |
| Ultimate Tensile Strength | MPa | 24.0 | 27.5 | 15.8 |
| 300% Modulus | MPa | 3.5 | 3.8 | 3.5 |
| 150% Modulus | MPa | 2.0 | 2.3 | 2.2 |
| Elongation | % | 875 | 830 | 890 |
| Hysteresis Testing (TD) | | | | |
| Peak Force @ 500% Elongation | MPa | 5.33 | 5.78 | 5.58 |
| Peak Force @ 200% Elongation | MPa | 1.67 | 1.88 | 1.81 |
| Relaxation @ 200% Elongation | % | 4.6 | 7.0 | 7.2 |
| Unload @ 50% Elongation | MPa | 0.72 | 0.71 | 0.70 |
| Ratio of Load @ 200% to Unload @ 50% | Ratio | 2.32 | 2.65 | 2.59 |
| Minimum Film Thickness | μm | 190 | N/A* | N/A* |
| Comment(s) | | Good Elasticity Thick film | Good Elasticity based upon tensile testing of a laboratory-scale plaque but unable to produce a film with a thickness of less than 700 μm | Good Elasticity based upon tensile testing of a laboratory-scale plaque but unable to produce a film with a thickness of less than 700 μm |

*This product has poor melt strength and does not yield a stable, thin film with a die opening of 914 micrometers

TABLE 4

| Ex No | No. | 1 | 2 | 3 | 4 | 5 | 6 |
|---|---|---|---|---|---|---|---|
| SBS-2 | Wt % | 80 | 75 | 70 | 65 | | |
| SBS-4 | Wt % | | | | | 75 | |
| SBS-5 | Wt % | | | | | | 75 |
| PS | Wt % | 15 | 15 | 15 | 15 | 15 | 15 |
| MO-200 | Wt % | 5 | 10 | 15 | 20 | 15 | 15 |
| Total, Wt. % | | 100 | 100 | 100 | 100 | 100 | 100 |
| Styrene Content of block copolymer | Wt %. | 22.4 | 22.4 | 22.4 | 22.4 | 20.0 | 20.8 |
| Melt Flow Rate, g/10 min. | dg/min. | 3.9 | 6.6 | 12.6 | 25.7 | 18.8 | 17.0 |
| Tensile Testing (MD) | | | | | | | |
| Ultimate Tensile Strength | MPa | 12.8 | 11.0 | 10.3 | 7.1 | 6.4 | 11.1 |
| 300% Modulus | MPa | 3.5 | 2.5 | 2.1 | 1.9 | 2.1 | 2.5 |
| 150% Modulus | MPa | 2.2 | 1.6 | 1.4 | 1.3 | 1.4 | 1.6 |
| Elongation | % | 860 | 900 | 930 | 860 | 820 | 840 |
| Hysteresis Testing (TD) | | | | | | | |
| Peak Force @ 500% Elongation | MPa | 5.38 | 4.31 | 3.50 | 2.76 | 2.98 | 3.96 |
| Peak Force @ 200% Elongation | MPa | 1.75 | 1.51 | 1.30 | 1.03 | 1.05 | 1.43 |
| Relaxation @ 200% Elongation | % | 7.0 | 6.2 | 6.0 | 6.7 | 7.6 | 7.1 |

TABLE 4-continued

| Ex No | No. | 1 | 2 | 3 | 4 | 5 | 6 |
|---|---|---|---|---|---|---|---|
| Unload @ 50% Elongation | MPa | 0.66 | 0.58 | 0.49 | 0.36 | 0.32 | 0.53 |
| Ratio of Load @ 200% to Unload @ 50% | Ratio | 2.65 | 2.60 | 2.65 | 2.86 | 3.28 | 2.70 |
| Minimum Film Thickness | μm | 76 | 71 | 38 | 51 | 38 | 38 |
| Comment(s) | | Good Elasticity Very Thin film | Good Elasticity Very Thin film | Good Elasticity Very Thin film | Good Elasticity Very Thin film | Good Elasticity Very Thin film | Good Elasticity Very Thin film |

The data presented in Tables 3 and 4 above support several observations. First, a comparison of Ex 3 and Comp Ex A, both of which have the same oil and polystyrene contents, shows that compositions based upon triblock copolymers of the present invention yield a much thinner film (38 μm for Ex 3 with a styrene content of 22.4 wt %) than that attainable with a triblock copolymer having a much higher styrene content (190 μm for Comp Ex A with a styrene content of 31 wt %) while providing hysteresis test performance comparable to that of the triblock copolymer with the higher styrene content. Second, a comparison of Comp Ex B and Comp Ex C with Ex 1, all of which have similar amounts of SBS-2, shows that a composition must contain more than three wt % mineral oil in order to provide a satisfactory thin film (thickness less than 100 μm).

The invention claimed is:

1. An oil-extended polymer blend composition comprising:
   a. as elastomeric linear styrene-butadiene-styrene triblock copolymer, the triblock copolymer having a styrene content within a range of from 15 percent by weight to 23 percent by weight, based upon block copolymer weight, and a molecular weight within a range of from 90,000 to 130,000;
   b. a thermoplastic polymer selected from a group consisting of polystyrene homopolymer, an ethylene-based polymer consisting of high-pressure low density polyethylene, high density polyethylene, linear low density polyethylene, ultra-low density polyethylene, ethylene/alpha-olefin copolymers wherein the alpha-olefin contains from three to twenty carbon atoms and ethylene/alpha-olefin interpolymers, a propylene-based polymer including homopolymer polypropylene, propylene/alpha-olefin copolymers wherein the alpha-olefin contains two (2) or from four (4) to eight (8) carbon atoms, and ethylene/vinyl acetate copolymers that have an ethylene content within a range of from 70 percent by weight to 93 percent by weight, based upon ethylene/vinyl acetate copolymer weight; and
   c. an extender oil, the extender oil being present in an amount within a range of from 4 percent by weight to 20 percent by weight, based upon total composition weight, wherein the styrene-butadiene-styrene triblock copolymer is present in an amount within a range of from 60 percent by weight to 85 percent by weight, based upon total composition weight.

2. The composition of claim 1, wherein the thermoplastic polymer is present in an amount within a range of from 10 percent by weight to 20 percent by weight, based upon total composition weight.

3. The composition of claim 1, wherein the amount of extender oil is within a range of from 5 percent by weight to 15 percent by weight, based upon total composition weight.

4. The composition of claim 1, wherein the styrene-butadiene-styrene tribiock copolymer has a styrene end block molecular weight for each end block within a range of from 9,500 to less than 15,000.

5. The composition of claim 1, wherein the extender oil is white mineral oil.

6. An elastormeric film comprising the composition of any of claims 1, 2 and 3-5, the film having a transverse direction ratio of load at 200 percent elongation to unload at 50 percent elongation less than 3.8.

7. The film of claim 6 having a thickness of less than 100 micrometers.

8. The film of claim 6, wherein the thickness is at least 25 micrometers.

9. The film of claim 6, wherein the film is a monolayer film or at least one layer of a multilayer film.

10. An elastomeric film comprising an oil-extended polymer blend composition, the composition comprising:
   a. an elastomeric linear styrene-butadiene-styrene triblock copolymer, the triblock copolymer having a styrene content within a range of from 15 percent by weight to 23 percent by weight, based upon block copolymer weight, and a molecular weight within a range of from 90,000 to 130,000;
   b. a thermoplastic polymer selected from a group consisting of polystyrene homopolymer, an ethylene-based polymer consisting of high-pressure low density polyethylene, high density polyethylene, linear low density polyethylene, ultra-low density polyethylene, ethylene/alpha-olefin copolymers wherein the alpha-olefin contains from three to twenty carbon atoms and ethylene/alpha-olefin interpolymers, a propylene-based polymer including homopolymer polypropylene, propylene/alpha-olefin copolymers wherein the alpha-olefin contains two (2) or from four (4) to eight (8) carbon atoms, and ethylene/vinyl acetate copolymers that have an ethylene content within a range of from 70 percent by weight to 93 percent by weight, based upon ethylene/vinyl acetate copolymer weight; and
   c. an extender oil, the extender oil being present in an amount within a range of from 4 percent by weight to 20 percent by weight, based upon total composition weight, wherein the thickness of the elastomeric film is less than 100 micrometers.

11. An elastomeric film comprising an oil-extended polymer blend composition, the composition comprising:
   a. an elastomeric linear styrene-butadiene-styrene triblock copolymer, the triblock copolymer having a styrene content within a range of from 15 percent by weight to 23 percent by weight, based upon block copolymer weight, and a molecular weight within a range of from 90,000 to 130,000;
   b. a thermoplastic polymer selected from a group consisting of polystyrene homopolymer, an ethylene-based polymer consisting of high-pressure low density polyethylene, high density polyethylene, linear low density polyethylene, ultra-low density polyethylene, ethylene/alpha-olefin copolymers wherein the alpha-olefin contains from three to twenty carbon atoms and ethylene/alpha-olefin interpolymers, a propylene-based polymer including, homopolymer polypropylene, propylene/alpha-olefin copolymers wherein the alpha-olefin contains two (2) or from four (4) to eight (8) carbon atoms, and ethylene/vinyl acetate copolymers that have an ethylene content within a range of from 70 percent by weight to 93 percent by weight, based upon ethylene/vinyl acetate copolymer weight; and c. an extender oil, the extender oil being present in an amount within a range of from 4 percent by weight to 20 percent by weight, based upon total composition weight, the film having a transverse direction ratio of load at 200 percent elongation to unload at 50 percent elongation less than 3.8.

* * * * *